United States Patent [19]

Snead

[11] Patent Number: 4,883,241

[45] Date of Patent: Nov. 28, 1989

[54] HELICOPTER PAD FOR TRAINS

[76] Inventor: Edwin DeS. Snead, P.O. Box 1000, Georgetown, Tex. 78626

[21] Appl. No.: 241,705

[22] Filed: Sep. 8, 1988

[51] Int. Cl.[4] .............................................. B64F 1/00
[52] U.S. Cl. ................................ 244/114 R; 105/238.1
[58] Field of Search ................... 105/355, 238.1, 463.1, 105/370, 407, 425; 244/110 E, 114 R, 116, 63; 248/637, 646, 647, 670, 678

[56] References Cited

U.S. PATENT DOCUMENTS

| | | | |
|---|---|---|---|
| 2,234,522 | 3/1941 | Fleet et al. | 105/463.1 |
| 2,246,716 | 6/1941 | Bottrill | 244/110 E |
| 2,415,071 | 2/1947 | Brie | 244/115 |
| 2,923,504 | 2/1960 | Ortega et al. | 244/114 |
| 3,147,940 | 9/1964 | Laufer | 244/114 |
| 3,785,316 | 1/1974 | Leming et al. | 114/43.5 |
| 4,116,408 | 9/1978 | Soloy | 244/144 R |
| 4,123,020 | 10/1978 | Korsak | 244/116 |
| 4,171,114 | 10/1979 | Marden | 244/116 |
| 4,665,857 | 5/1987 | Akerman et al. | 244/110 E |
| 4,669,683 | 6/1987 | Guillory | 244/110 E |

FOREIGN PATENT DOCUMENTS 1216121 5/1966 Fed. Rep. of Germany .

Primary Examiner—Joseph F. Peters, Jr.
Assistant Examiner—Rodney Corl
Attorney, Agent, or Firm—Harrison & Egbert

[57] ABSTRACT

The helicopter pad for use on trains comprising a flat surface having an area suitable for the receipt of helicopter skids, a plurality of structural members connected to the flat surface and to the frame of a railroad car, and a ladder extending from the flat surface to the frame of the railroad car. The ladder serves to provide access to the flat surface. The flat surface has a strength suitable for supporting the weight of the helicopter. The flat surface is of high friction material. The railroad car is a transfer car for a unit train having an underlying conveyor system. The flat surface is positioned above a lift portion of the conveyor system on the transfer car. An extensible portion of this flat surface increases the area of the flat surface. This extensible portion is selectively actuable. The flat surface is free of protrusions extending thereabove.

18 Claims, 3 Drawing Sheets

HELICOPTER PAD FOR TRAINS

TECHNICAL FIELD

The present invention relates to helicopter pads. More particularly, the present invention relates to helicopter pads adaptable for use on a train.

BACKGROUND ART

By federal law, railroad trainmen are not allowed to work more than twelve hours in one continuous shift. Because of the uncertainty of traffic conditions and other possible delays, trains must be scheduled to arrive at a convenient location for changing crews. Usually, this is about one hour before the expiration of the twelve hour time limit. Otherwise, by law, the train must be stopped where it is and the new crew must be brought to the train. The necessity of avoiding an inconvenient and expensive change of crews requires that the entire train system be scheduled at less than full capacity.

In mid-1985, a self-unloading train was developed by the present inventor. This invention, describes in detail in U.S. application Ser. No. 047,005, filed on May 6, 1987, and entitled "Self-Unloading Train for Bulk Commodities", describes a train having the rapid unloading capability of a belt system and the carrying capacity of a railroad-size hopper. This self-unloading train incorporated a ten-car unit train and a transfer-conveyor car. The transfer-conveyor car consisted of a low-profile flat car equipped with belt drives, unloading booms, and an auxiliary diesel engine. In operation, each hopper car is emptied onto a four foot wide longitudinal belt which carries the material from the hopper cars to the transfer cars. When entering the transfer car, the belt ascends at a twenty degree angle, on a lift conveyor, thereby lifting the aggregate stream approximately twelve feet to where it is dropped through a small hopper onto a second belt. The second belt is mounted on a thirty foot pivoted unloading boom. The boom is tilted upward at a twenty degree angle, and is capable of being swung through a one hundred and ten degree arc on either side of the train. This self-unloading train greatly maximizes the efficiency of manpower, carrying capacity, and aggregate transport.

U.S. Pat. No. 4,123,020, issued on Oct. 31, 1978, describes a VTOL launching and retrieval system. This system has a mechanical arm equipped with a clamping device arranged to take hold of the VTOL while it is in an upright position. The helicopter has a landing gear of cylindrical shape. A grasping arm reaches this landing gear, grabs the gear, and moves the VTOL into its hanger.

U.S. Pat. No. 4,171,114, issued on Oct. 16, 1979, describes a mobile aerial support system. In other words, this describes a mobile pad for a helicopter consisting of an open, drop-bed trailer which is adapted to bear and restrain the helicopter. A tractor is adapted to pull the trailer with the helicopter mounted thereon.

U.S. Pat. No. 3,147,940, issued on Sept. 8, 1964, describes, in detail, a portable heliport and associated transporting vehicle. In this invention, the vehicle also serves as a working platform for readying the helicopter for flight operations. The pilot can land the helicopter on the open platform. The prior art in this area does not recognize the need of helicopter platforms for use in conjunction with trains.

It is an object of the present invention to provide a helicopter pad that can be used in conjunction with trains.

It is another object of the present invention to provide a helicopter pad that maximizes the efficiency of crew usage.

It is a further object of the present invention to provide a helicopter pad that maximizes the safety of the helicopter, the helicopter crew, and the manpower onboard the helicopter.

It is still a further object of the present invention to provide a helicopter pad that is inexpensive to manufacture, easy to adapt, and does not occupy otherwise useful space onboard a train.

These and other objects and advantages of the present invention will become apparent from a reading of the attached specification and appended claims.

SUMMARY OF THE INVENTION

The present invention is a helicopter pad for use on trains that comprises a flat surface having an area suitable for the receipt of helicopter skids, a plurality of structural members connecting the flat surface to the frame of the railroad car, and a ladder extending from the flat surface and connected to the frame of the railroad car. The flat surface has the strength suitable for supporting the weight of a helicopter. The ladder provides access to this flat surface.

The flat surface/landing pad of the present invention is of a high friction material. In particular, this flat surface comprises a plurality of sections of plywood material. A plurality of stiffeners extend behind these sections of plywood material so as to provide structural stability to the flat surface. The sections of plywood material extend across the width of the railroad car. The stiffeners are connected to these sections and extend transverse thereto. The flat surface, importantly, is free of protrusions extending upwardly therefrom.

The structural members comprise a plurality of vertical members connected to the frame at one end and to the back of the flat surface on the other end. A plurality of crossmembers angle from the connection of the vertical member with the frame to a central area between these vertical members. The vertical members and the crossmembers are connected to the periphery of the frame with the railroad car.

The ladder of the present invention comprises a stairway connected at one end of the railroad car and extending upwardly to the flat surface. The stairway terminates below the flat surface. The ladder also includes a handrail aligned with the stairway and extending generally parallel to the stairway. The handrail terminates below the flat surface. The flat surface is positioned higher above the ground on the railroad car than the height of an adjacent railroad car.

The railroad car may be a transfer car for a unit train having an underlying conveyor system. This flat surface is positioned above a lift portion of the conveyor system of the transfer car. The railroad car may also be a boxcar. On a boxcar. On a boxcar, the flat surface is in abutment with the top surface of the boxcar. A ladder extends upwardly and is connected to a surface of the boxcar.

The present invention also includes an extensible portion of the flat surface for increasing the area of the flat surface. This extensible portion is selectively actuable. The extensible portion is hinged to one side of the flat surface. This extensible portion has a hydraulic cylinder connected thereto. This hydraulic cylinder serves to rotate the extensible portion from a vertical position to a position flush with the flat surface. A second extensible portion is connected to the upper side of the flat surface and operates in the same manner as the first extensible portion.

The present invention was developed to improve the efficiency of manpower usage in connection with the self-unloading train, described herein previously. In the invention, the transfer car of the self-unloading train is equipped with an elevated helicopter platform. Both the locomotive and the helicopter are equipped with cellular telephones or other means of radio communication. With such a system in operation, the train crew can take advantage of every opportunity to move forward, almost totally disregarding the twelve hour time limit. The relief crew in the helicopter can be carried to any convenient location. The active train crew can continue producing revenue-ton miles until the last minute of their time limit.

By having an elevated platform, twelve to fourteen feet above the track surface and the blades another eight feet above the platform, the helicopter's main rotor blades will be above the clearance line of any possible train on an adjacent track.

The cost of operating the helicopter may be in the order of three or four hundred dollars per hour. Such a system may require an hour to change crews. However, in the case of the self-unloading train, described herein previously, an extra trip in a shift could easily be worth a thousand dollars or more for a two or a three to one payoff ratio.

Importantly, the technique of the present invention need not be limited to the self-unloading trains or to any type of train, in particular. Even the most efficient of all freight trains, that is, the unit coal train, could profit by this technique of changing crews.

In embodiments other than the self-unloading train, the helicopter platform could be used atop the locomotive or on top of one of the freight cars, or on a specially designed helicopter landing car. However, it must be noted that, to be useful, the platform must be elevated so that the blades are more than twenty-two feet above the surface of the track. This assumes that the train will be at rest when the helicopter lands and takes off. Of course, this is not necessarily true. It is possible to land the helicopter within a few inches of a predetermined spot, even at a reasonably high air speed. For instance, a train could be moving at more than sixty miles per hour and the helicopter could still land within a few inches of the designated spot on a platform.

The platform could be equipped with radio-controlled clamps to quickly rise out of the surface of the platform and clamp the skids onto the platform. The crew could then be changed while the train is in motion. The helicopter pilot could get the craft ready for take-off and loosen the restraining straps by radio command. The helicopter pilot could then fly away with the crew. Under such a situation, it would be up to the dispatcher and the train crew to determine that there were no interfering tunnels, overhead wires, bridges, or other obstructions that might be dangerous to the helicopter on top of the train. Since these hazardous locations are fixed and well known, it should be possible to avoid encountering any one of these for hours at a time.

DETAILED DESCRIPTION OF THE INVENTION

Figure 1:
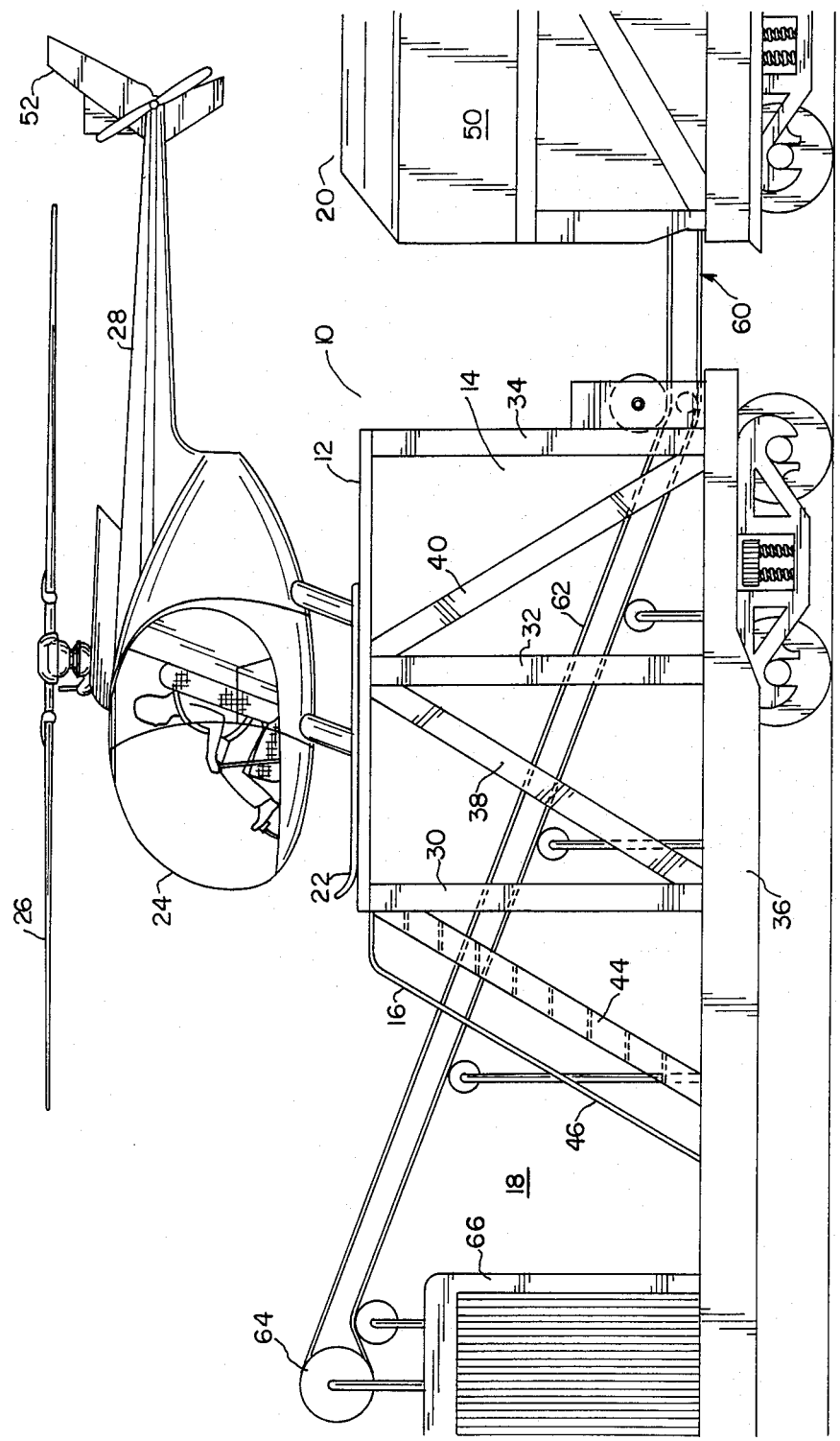
FIG. 1 is a view, in side elevation, of the helicopter pad of the present invention, as used in conjunction with a self-unloading train.

Referring to FIG. 1, there is shown at 10 the helicopter pad of the present invention. Helicopter pad 10 comprises a flat surface 12, structural support members 14, and a ladder system 16. Helicopter pad 10 is positioned for use, in FIG. 1, onboard trailer car 18 used in conjunction with unit train 20.

Flat surface 12 has an area suitable for the receipt of helicopter skids 22 of helicopter 24. Flat surface 12 should have an area of at least thirteen feet by thirteen feet. The flat surface 12 should also have a strength suitable for supporting the weight of helicopter 24. Skids 22 of helicopter 24 serve as the landing gear for the helicopter. These skids 22 have a generally smooth surface in contact with the flat surface 12.

Flat surface 12, so as to properly restrain the skids 22 of helicopter 24, should be of high friction material. Since the train 20 may be moving or the transfer car 18 may be vibrating, a high friction material is important to maintain the helicopter 24 in its proper, landed position. As will be described hereinafter, flat surface 12 comprises a plurality of sections of plywood material. Stiffeners are used to give the plywood material proper strength.

Importantly, flat surface 12 should be free of any protrusions extending therefrom. During the landing of helicopters on any surface, the skids 22 must not accidentally abut a protruding surface. If the skids 22 should accidentally abut a surface and the helicopter tilt, an accidental tilting of more than fifteen degrees could cause the helicopter to topple over. This is due to the rotational inertia of the helicopter blades 26 in combination with the rotational movement of the helicopter body 28. As such, the present invention attempts to remove any protrusions that could cause such an accident.

The structural members 14 comprise a plurality of vertical members 30, 32, and 34. These vertical members 30, 32, and 34 are connected to the frame 36 of transfer car 18 and to the bottom surface of flat surface 12. A plurality of crossmembers 38 and 40 angle inwardly from the connection of the vertical members 30 and 34 with frame 36 to the central area of the flat surface 12. The vertical members 30, 32, and 34 and the crossmembers 38 and 40 are connected to the periphery of the frame 36 of the railroad transfer car 18.

The ladder is a stairway 44 that is connected at one end to the frame 36 of the railroad transfer car 18 and extends upwardly, at an angle, to flat surface 12. The stairway 44 terminates below flat surface 12. In addition, a handrail 46 is aligned with stairway 44 and extends upwardly, generally parallel, to the stairway. As with the stairway, and described hereinafter, the handrail 46 terminates below the flat surface 12. The configuration of the stairway 44 and the handrail 46 is important to prevent the protrusion of any surface above the level of flat surface 12. This, as stated previously, helps to avoid accidental toppling of the helicopter 24.

Flat surface 12 is positioned approximately thirteen feet above the ground. Importantly, flat surface 12 is positioned higher above the ground than the height of adjacent railroad car 50. In typical use, adjacent hopper car 50 has a height of twelve feet. It is important to place the flat surface 12 at a higher level so as to provide proper clearance between the rotor 52 of helicopter 24 and the highest point of the adjacent railroad car 50. This arrangement further enhances the safety of the helicopter pad of the present invention.

Transfer car 18 is a multi-purpose car, and, as shown in FIG. 1, consists of a conventional flat bed car 36 containing certain structures. Unit car conveyor system 60 is carried by the end of the transfer car 18.

Train conveyor 60 traverses the entire length of the unit train 20. In unit trains, the cars of the train are permanently coupled together. The invention, described in FIG. 1, utilizes hopper cars 50 for the transport of aggregates. Each hopper car 50 may include three separate hoppers, each having a bottom discharge opening and associated discharge gate. These hopper cars 50 are designed to support an endless belt train conveyor, which traverses the length of the train. Train conveyor 60 underlies the discharge gates of these several hoppers. A complete description of such a conveyor system is described in connection with U.S. application Ser. No. 047,005. A lift portion 62 of conveyor system 60 elevates conveyed material for discharge at point 64. Lift portion 62 is supported by a suitable frame structure on the transfer car 18. A power unit 66 provides the necessary power generating equipment for operating the conveyor system 60. The train conveyor 60 and the lift portion 62 are preferably driven by suitable electric motors; and the power for these motors may be generated by suitable electric generators driven by suitable internal combustion engines included within power unit 66.

The helicopter landing pad 10 is properly positioned within the area over this lift portion 62 of the conveyor system 60. As such, this helicopter landing pad 10 occupies otherwise unusable space onboard the transfer car 18. The height of the flat surface 12 is sufficient to avoid any encounter with material transferred by the lift portion 62 of conveyor system 60. In addition, the structural members 30, 32, 34, 38, and 40 are positioned on the opposite sides of the lift portion 62. The ladder arrangement 16 is clear of the conveyor 62 by being placed on one side of conveyor 62. Importantly, the lift conveyor has a width less than the width of the frame of transfer car 18.

Figure 2:
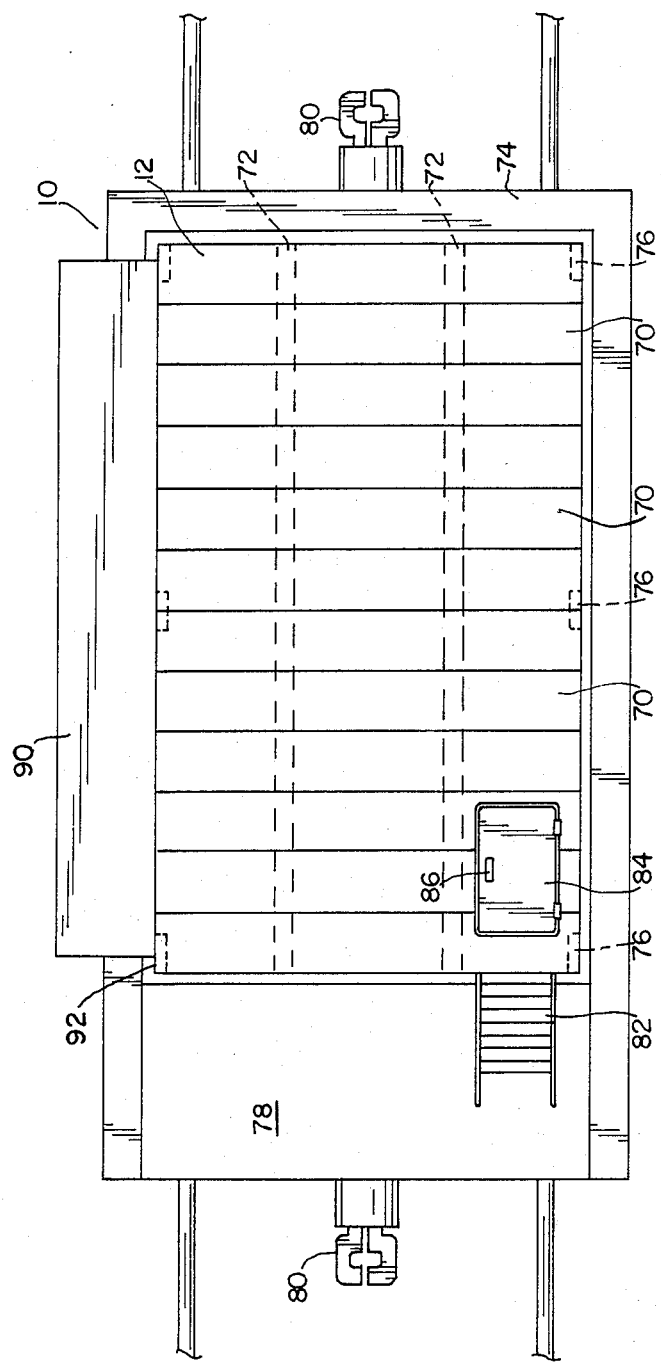
FIG. 2 is a top view of the helicopter pad showing, in particular, an embodiment having trap-door access to the flat surface.

FIG. 2 is a top view of the helicopter pad 10. As can be seen in FIG. 2, the flat surface 12 is comprised of a plurality of linear sections 70 of plywood material. Plywood material is a high friction material, is relatively inexpensive, and is structurally suitable for the receipt of helicopter skids. A plurality of stiffeners 72 are attached to the sections of plywood 70 and extend beneath the sections of plywood 70. The sections 70 extend across the width of the railroad car 74. As used in the embodiment of FIG. 2, railroad car 74 may be the transfer car 18 of FIG. 1, or may be a specially designed helicopter landing car. For instance, car 74 may be a conventional flat bed car having the necessary structural members 76 for supporting the flat surface 12 above the flat bed surface 78 of railroad car 74. This embodiment is shown so as to infer that the present invention should not merely be limited to use onboard a transfer car of a self-unloading train. Railroad car 74 may be coupled to a train by the use of conventional couplers 80.

The stiffeners 72 extend transverse to the sections 70. The stiffeners 72 may be steel bars that underlie the sections 70 for the mechanical support of these sections.

As can be seen in FIG. 2, entrance to the flat surface 12 may be accomplished by climbing the stairway 82 to the trapped door 84. Trap door 84 has a top surface that is flush with the flat surface 12 of the helicopter pad 10. Trap door 84 may be opened by pulling on indented handle 86. Trap door 84 opens upwardly in a conventional manner. So as to maintain the flatness of the flat surface 12, no hinges or other protrusions should extend upwardly from trap door 84. Trap door 84 should only be opened after the helicopter is landed. Stairway 82 extends from the flat bed 78 upwardly to the helicopter pad 12.

FIG. 2 illustrates the use of an extensible portion 90 in conjunction with the flat surface 12. This extensible portion 90 serves to increase the area of the flat surface 12 so as to provide more area on which the helicopter may land. The extensible portion 90 is selectively actuable by the train operator or by the helicopter pilot (by remote means). Extensible portion 90 extends from side 92 of flat surface 12. This extensible portion 90 may be hinged to side 92, or may slide outwardly from side 92. The most important requirements are that extensible portion 90 have a top surface that is generally flush with flat surface 12. Additionally, extensible portion 90 should have a strength suitable for supporting the helicopter weight.

This extensible portion 90 should be used selectively. Since there are requirements that railroad cars not exceed a certain width, the use of the extensible portion 90 is used only during times of helicopter landing. In addition, this extensible portion 90 would only be used when the railroad car 74 is at a stop. Also, the extensible portion 90 should not have a width that would extend into the lane of traffic of an adjacent railroad track. As will be described hereinafter, this extensible portion 90 may also extend from the other side of the helicopter pad 10.

Figure 3:
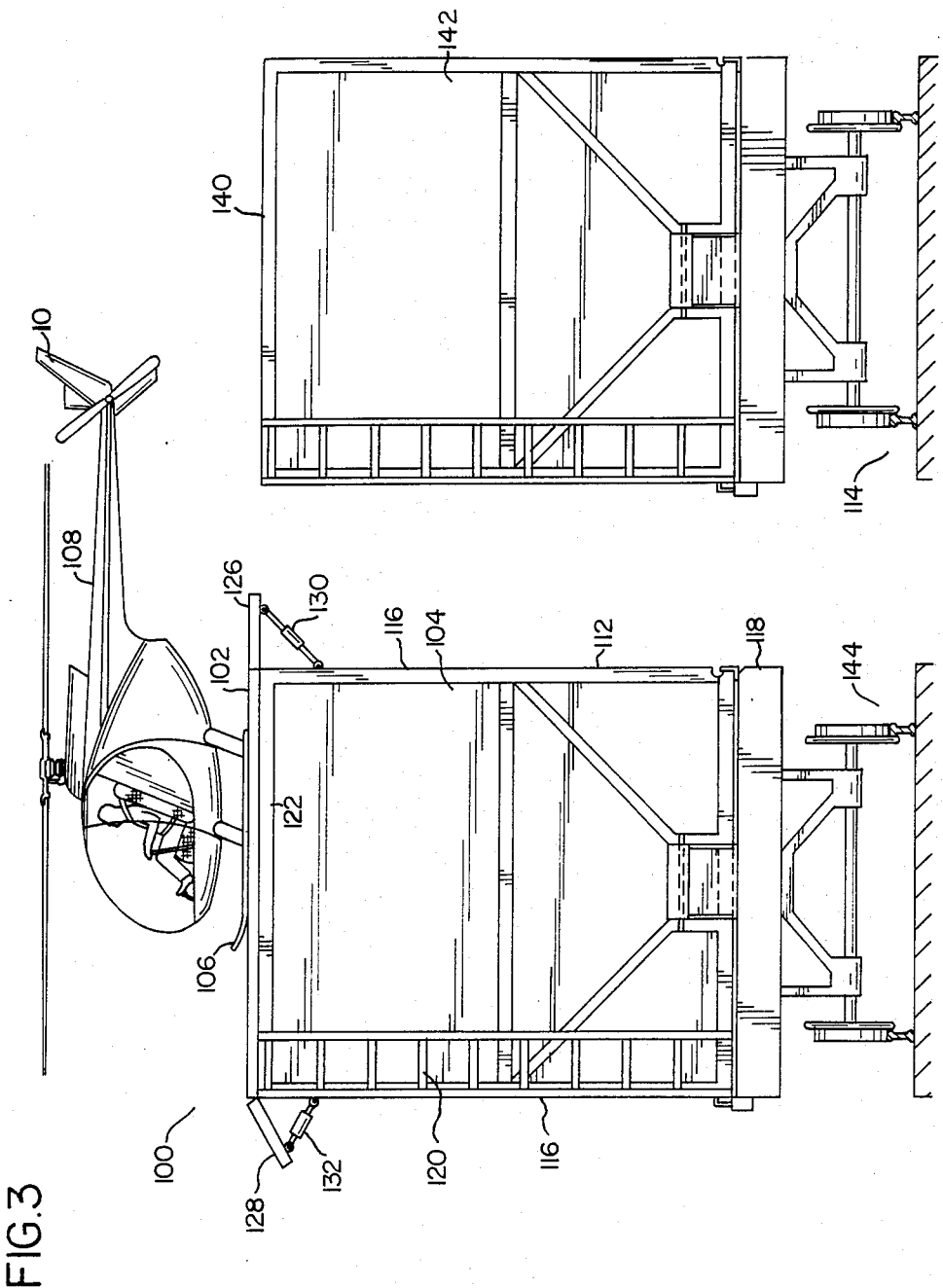
FIG. 3 is an end view showing an embodiment of the helicopter pad of the present invention, onboard a box-car, and showing, also, the clearance of the helicopter rotor above an adjacent track.

Referring to FIG. 3, there is shown an alternative embodiment of helicopter landing pad 100. As can be seen in FIG. 3, flat surface 102 is positioned at the top of boxcar 104. As before, the flat surface 102 has an area suitable for the receipt of helicopter skids 106. In the embodiment illustrated in FIG. 3, it can be seen that helicopter 108 comes to rest transverse the longitudinal axis of boxcar 104. Tail rotor 110 extends beyond the wall 112 of boxcar 104. Tail rotor 110 overhangs an adjacent railroad track 114.

A plurality of structural members 116 are connected to the flat surface 102 at one end and to the frame 118 of boxcar 104 at the other end. The structural members provide structural ability to the helicopter landing pad 100 and serve as the structural members of boxcar 104.

A ladder 120 extends from flat surface 102 and is connected, at the other end, to frame 118. Ladder 120 provides access to the flat surface 102. As with the previous embodiment, the flat surface 102 should be free of any protrusions extending upward beyond the surface. As such, ladder 120 terminates below the level of surface 102.

Flat surface 102 is in abutment with the roof area 122 of boxcar 114. Roof 122 can have many configurations in typical boxcar construction. Roof 122 can be arched, can be tiered, or can have a variety of other configurations. If roof 122 is arched, then the structural members 116 should extend upward so as to provide the necessary structural support for those areas of the flat surface 102 not in contact with roof 122.

Importantly, in FIG. 3, there is shown an arrangement of extensible portions 126 and 128. Extensible portions 126 and 128 are connected to the sides of flat surface 102 for increasing the area of the flat surface 102. These extensible portions 126 and 128 are selectively actuable. Extensible portion 126 is hinged to flat surface 102. A hydraulic cylinder 130 has one end connected to extensible portion 126, and the other end connected to the side of boxcar 104. Upon actuation, the hydraulic cylinder 130 provides the necessary power to rotate extensible portion 126 from a vertical position adjacent the wall of boxcar 104 to a position flush with the flat surface 102, as illustrated in FIG. 3. As stated previously, it is important that the surface 102 be flat so as to prevent any accidental rotation of the helicopter body during landing. The extensible portion 126 and hydraulic cylinder 130 should have sufficient capacity to withstand the weight of the helicopter 108 should the skids 106 of helicopter 108 land on the extensible portion 126.

A second extensible portion 128 is hinged to the other side of flat surface 102. In FIG. 3, it can be seen that the extensible portion 128 is being rotated into its position by hydraulic cylinder 132. When both extensible portions 126 and 128 are in alignment with flat surface 102, helicopter 108 has a wide area upon which to land.

FIG. 3 illustrates an important concept of this alternative embodiment. Importantly, the tail rotor 110 has sufficient clearance above the roof 140 of adjacent boxcar 142. During the operation of the present invention, boxcar 104 will be stationary during the landing of helicopter 108. In usual settings, there will be useful tracks 114 adjacent to the tracks 144 upon which boxcar 104 rests. For the safety of the personnel on the helicopter, tail rotor 110 should be placed with maximum clearance above the roof 140 of boxcar 142. This can be accomodated since the height of railroad cars, such as boxcar 142, are regulated by federal law. As a result, there will be no risk associated with the passing of boxcar 142 beneath tail rotor 110 of helicopter 108.

The present invention, in its various embodiments, maximizes the efficiency of manpower used on the railroad. By federal law, railroad trainmen are not allowed to work more than twelve hours in one continuous shift. Trains must be scheduled to arrive at a convenient location so that the crews can be changed in accordance with this federal law. If the train is not in a convenient location, then the train must be stopped where it is and a new crew must be brought to the train. As a result, the entire train system is scheduled so as to avoid an inconvenient and expensive change of crews. This prevents the train from being scheduled at full capacity.

By the use of the helicopter platform of the present invention, the train crew can take advantage of every opportunity to move forward, without regard to the twelve hour limit. The relief crew on the helicopter can be carried to any convenient place for the train to stop and the active train crew can continue producing revenue-ton miles until the last minute of their time limit. As a result, a comparison of the cost of helicopter operation versus the costs of this manpower delay, the present invention offers a payoff ratio of up to three-to-one.

Importantly, the present invention is not intended to be limited to a self-unloading train, or to any type of train, in particular. The present invention can be used on box cars, as shown in FIG. 3, on an independent, specially designed helicopter landing car, as illustrated in FIG. 2, or on top of a locomotive.

The foregoing disclosure and description of the invention is illustrative and explanatory thereof, and various changes in the details of the illustrated apparatus may be made within the scope of the appended Claims without departing from the true spirit of the invention. The embodiments shown above are illustrative only and are not intended to limit the scope of the present invention, which should be interpreted only according to the appended Claims and their legal equivalents.

I claim:
1. A helicoper pad for use on trains comprising:
a flat surface having an area suitable for the receipt of helicopter skids, said flat surface having a strength suitable for supporting the weight of a helicopter, said flat surface comprising a plurality of sections of plywood material, said flat surface having a plurality of stiffeners extending beneath said sections;
a plurality of structural members connecting said flat surface to the frame of a railroad car; and
ladder means extending from said flat surface and connected to the frame of said railroad car, said ladder means for providing access to said flat surface.

2. The helicopter pad of claim 1, said flat surface being of high friction material.

3. The helicopter pad of claim 1, said sections of plywood material extending across the width of said railroad car, said stiffeners connected to said sections and extending transverse thereto.

4. The helicopter pad of claim 1, said flat surface being free of protrusions extending above said surface.

5. The helicopter pad of claim 1, said ladder means comprising:
a stairway connected at one end to said railroad car and extending upwardly to said flat surface, said stairway terminating below said flat surface.

6. The helicopter pad of claim 5, said ladder means further comprising:
a handrail aligned with said stairway and extending generally parallel to said stairway, said handrail terminating below said flat surface.

7. The helicopter pad of claim 1, said railroad car being a transfer car for a unit train having an underlying conveyor system, said flat surface positioned above a lift portion of said conveyor system on said transfer car.

8. The helicopter pad of claim 1, said railroad car being a boxcar, said flat surface in abutment with the top surface of said boxcar, said ladder means comprising a ladder extending upwardly and connected to a wall of said boxcar.

9. A helicopter pad for use on trains comprising:
a flat surface having an area suitable for the receipt of helicopter skids, said flat surface having a strength suitable for supporting the weight of a helicopter;
a plurality of structural members connecting said flat surface to the frame of a railroad car, said structural members comprising:

a plurality of vertical members connected to said frame at one end and to the back of said flat surface at the other end; and a plurality of crossmembers angling inwardly from the connection of said vertical members with said frame and extending upwardly toward said flat surface; and ladder means extending from said flat surface and connected to the frame of said railroad car, said ladder means for providing access to said flat surface.

10. The helicopter pad of claim 9, said vertical members and said crossmembers connected to the periphery of said frame of said railroad car.

11. A helicopter pad for use on trains comprising:

a flat surface having an area suitable for the receipt of helicopter skids, said flat surface having a strength suitable for supporting the weight of a helicopter, said flat surface positioned higher above the ground on said railroad car than the height of an adjacent railroad car;

a plurality of structural members connecting said flat surface to the frame of a railroad car; and ladder means extending from said flat surface and connected to the frame of said railroad car, said ladder means for providing access to said flat surface.

12. A helicopter pad for use on trains comprising:

a flat surface having an area suitable for the receipt of helicopter skids, said flat surface having a strength suitable for supporting the weight of a helicopter;

a plurality of structural members connecting said flat surface to the frame of a railroad car;

ladder means extending from said flat surface and connected to the frame of said railroad car, said ladder means for providing access to said flat surface; and an extensible portion of said flat surface for increasing in the area of said flat surface, said extensible portion being selectively actuable, said extensible portion extending from a side of said flat surface.

13. The helicopter pad of claim 12, said extensible portion being hinged to one side of flat surface, said extensible portion having a hydraulic cylinder connected thereto, said hydraulic cylinder for rotating said extensible portion from a vertical position to a position flush with said flat surface.

14. The helicopter pad of claim 13, further comprising:

a second extensible portion connected to the other side of said flat surface, said second extensible portion having a hydraulic cylinder connected thereto, said hydraulic cylinder for rotating said second extensible portion from a vertical position to a position flush with the other side of said flat surface.

15. A helicopter pad for a train comprising:

a trailer car having a lift conveyor extending at an angle upwardly from one end of said trailer car, said lift conveyor having a width less than the width of the frame of said trailer car;

a plurality of structural members connected at on end to said frame and extending upwardly therefrom, said structural members positioned on opposite sides of said lift conveyor; and a flat surface connected to the other end of said structural members and above at least a portion of said lift conveyor, said flat surface having an area suitable for the receipt of helicopter skids, said flat surface having a strength suitable for supporting the weight of a helicopter, said trailer car connected to a unit train having an underlying conveyor for the receipt of material discharged from hopper cars, said lift conveyor positioned for receiving material from said underlying conveyor, said unit train having a height less than the height of said flat surface on said trailer car.

16. The helicopter pad of claim 15, further comprising:

a ladder means extending from said flat surface and connected to the frame of said trailer car, said ladder means for providing access to said flat surface, said ladder means positioned on one side of said lift conveyor.

17. The helicopter pad of claim 16, said ladder means terminating below said flat surface.

18. A helicopter pad for a train comprising:

a trailer car having a lift conveyor extending at an angle upwardly from one end of said trailer car, said lift conveyor having a width less than the width of the frame of said trailer car;

a plurality of structural members connected at one end to said frame and extending upwardly therefrom, said structural members positioned on opposite sides of said lift conveyor;

a flat surface connected to the other end of said structural members and above at least a portion of said lift conveyor, said flat surface having an area suitable for the receipt of helicopter skids, said flat surface having a strength suitable for supporting the weight of a helicopter; and an extensible portion of said flat surface for increasing the area of said flat surface, said extensible portion being selectively actuable, said extensible portion extending from a side of said flat surface.

* * * * *